Patented Apr. 21, 1953

2,636,010

UNITED STATES PATENT OFFICE 2,636,010

LUMINESCENT MATERIALS AND PREPARATION THEREOF

Jerome S. Prener, Schenectady, N. Y., assignor to General Electric Company, a corporation of New York No Drawing. Application April 5, 1951, Serial No. 219,521

12 Claims. (Cl. 252—301.6)

This invention relates to luminescent materials. More particularly, it relates to manganese activated cadmium phosphate-zinc fluoride phosphors which luminesce under ultraviolet and cathode ray excitation.

With the expansion of the field of fluorescent lighting and color television, there has arisen a need for colored light emitting phosphors.

An object of my invention is to provide a luminescent material which emits red colored light under cathode ray and ultraviolet excitation.

A further object of my invention is to provide a red colored light emitting phosphor in which the color shade may be controlled by varying the phosphor composition or the amount of activator.

Other objects will become apparent from a consideration of the following description.

According to my invention precipitated cadmium phosphate and zinc fluoride are mixed in appropriate proportions along with a manganese activator and fired to produce a phosphor which, under ultraviolet and cathode ray excitation (2537 Å. and 3650 Å.), emits red colored light.

It is preferable that the cadmium phosphate be freshly precipitated. For example, 300 grams of C. P. cadmium nitrate tetrahydrate or a proportionate quantity of another soluble cadmium salt are dissolved in 800 cc. of distilled water while 150 grams of dibasic ammonium phosphate are dissolved in another 800 cc. portion of distilled water. Both solutions are heated to boiling, 10 cc. of each solution added to the rest of the other, and the precipitates allowed to stand for about fifteen hours and filtered off. This procedure removes impurities from the solutions. The solutions are again heated to boiling and the dibasic ammonium phosphate solution added to the cadmium nitrate solution. The precipitated cadmium phosphate is filtered, washed with hot distilled water, and dried. The above recited preparation of precipitated cadmium phosphate is intended as exemplary only of the many methods as well as materials which may be used in its preparation. The formula of the above cadmium phosphate is $$Cd_3(PO_4)_2 \cdot 2CdHPO_4 \cdot 4H_2O$$

To prepare a useful phosphor, the precipitated cadmium phosphate is mixed as by grinding with an appropriate amount of pure zinc fluoride and manganese activator and fired.

According to my invention the starting material contains from five to twenty per cent, by weight, of zinc fluoride and from one-eighth to four per cent, by weight, of manganese, with the remainder the precipitated cadmium phosphate.

While the materials can be fired at any temperature ranging from 900° C. to 1100° C., a firing range of from 900° C. to 1000° C. gives phosphors of higher efficiency, with those fired at 950° C. being the most efficient. Firing of the samples for more than one hour does not improve the qualities of the phosphors.

To test the effect of varying the zinc fluoride content, phosphors were prepared with five, ten, and twenty per cent, by weight, of zinc fluoride and one-half per cent, by weight, manganese in the form of manganese ammonium phosphate with firing at 950° C. for one hour. When tested with an eye-corrected photocell, the phosphor containing five per cent, by weight, zinc fluoride showed the greatest visual efficiency at 2537 Å. The phosphor containing ten per cent, by weight, zinc fluoride had a visual efficiency about eighty-two per cent of the preceding example, while the material having twenty per cent, by weight, zinc fluoride had a relative visual efficiency of only sixty-five per cent. The decrease in visual efficiency with increase in zinc fluoride content is largely due to the shift of the luminescent color toward the red.

The table shows the relative peak efficiencies at 2537 Å. together with the emission peak wavelengths, half widths of the emission band, and relative visual efficiency of such phosphors.

Table

| Percent by Wt. ZnF$_2$ | Emission Peak, Å. | Half Width of Emission Band, Å. | Relative Peak Efficiency | Relative Visual Efficiency |
|---|---|---|---|---|
| 5 | 6,200 | 860 | 80 | 100 |
| 10 | 6,380 | 880 | 96 | 82 |
| 20 | 6,500 | 860 | 100 | 65 |

In order to determine the effect of activator concentration on the phosphors, the concentration of manganese was varied from one-eighth to four per cent, by weight, for materials containing five per cent and twenty per cent, by weight, zinc fluoride with firing at 950° C. for one hour. With five per cent, by weight, zinc fluoride, the most efficient phosphors contained from one-quarter to one per cent, by weight, manganese. The visual efficiency under 2537 Å. excitation was greatest at from one-eighth to one per cent, by weight, manganese. The increase in manganese content was accompanied by a shift of the emitted light toward the red. With one-eighth per cent, by weight, manganese, the emission peak was at 6150 Å., while with four per cent, by weight, manganese it was at about 6250 Å.

In phosphors containing twenty weight per cent zinc fluoride, the greatest visual efficiency was attained using one-eighth per cent, by weight, manganese with the visual efficiency dropping off at higher activator concentrations and the color shifting toward the red.

For the same manganese concentration, phosphors having twenty weight per cent zinc fluoride are characterized by lower visual efficiencies than those containing five weight per cent zinc fluoride, with, however, an emission which is more displaced toward the red.

Any of the usual manganese compounds may be used in providing the manganese activator, including manganese ammonium phosphate, manganese oxide, manganese carbonate, manganese phosphate, and the like.

In lieu of separately preparing the cadmium phosphate, a cadmium compound such as cadmium carbonate and dibasic ammonium phosphate may be mixed in a molar ratio of three to two along with appropriate quantities of zinc fluoride and manganese activator, as described, and fired for one hour as above. The resultant cadmium phosphate has the formula $Cd_3(PO_4)_2$. However, separate preparation of the precipitated cadmium phosphate pointed out heretofore yields phosphors of higher efficiency.

What I claim as new and desire to secure by Letters Patent of the United States is:

1. A luminescent material consisting of the fired reaction product of, by weight, from five to twenty per cent zinc fluoride, from one-eighth to four per cent manganese activator, with the remainder a member selected from the group consisting of $Cd_3(PO_4)_2$ and $Cd_3(PO_4)_2 \cdot 2CdHPO_4 \cdot 4H_2O$.

2. A luminescent material consisting of the fired reaction product of, by weight, five per cent zinc fluoride, one-half per cent manganese actuator, with the remainder a member selected from the group consisting of $Cd_3(PO_4)_2$ and $Cd_3(PO_4)_3 \cdot 2CdHPO_4 \cdot 4H_2O$.

3. A luminescent material consisting of the fired reaction product of, by weight, five per cent zinc fluoride, one-fourth to one per cent manganese activator, with the remainder a member selected from the group consisting of $Cd_3(PO_4)_2$ and $Cd_3(PO_4)_2 \cdot 2CdHPO_4 \cdot 2H_2O$.

4. A luminescent material consisting of the fired reaction product of, by weight, five per cent zinc fluoride, one-eighth per cent manganese activator, with the remainder a member selected from the group consisting of $Cd_3(PO_4)_2$ and $Cd_3(PO_4)_2 \cdot 2CdHPO_4 \cdot 4H_2O$.

5. A luminescent material consisting of the fired reaction product of, by weight, five per cent zinc fluoride, four per cent manganese activator, with the remainder a member selected from the group consisting of $Cd_3(PO_4)_2$ and $Cd_3(PO_4)_2 \cdot 2CdHPO_4 \cdot 4H_2O$.

6. A luminescent material consisting of the fired reaction product of, by weight, ten per cent zinc fluoride, one-half per cent manganese activator, with the remainder a member selected from the group consisting of $Cd_3(PO_4)_2$ and $Cd_3(PO_4)_2 \cdot 2CdHPO_4 \cdot 4H_2O$.

7. A luminescent material consisting of the fired reaction product of, by weight, twenty per cent zinc fluoride, one-eighth per cent manganese activator, with the remainder a member selected from the group consisting of $Cd_3(PO_4)_2$ and $Cd_3(PO_4)_2 \cdot 2CdHPO_4 \cdot 4H_2O$.

8. A luminescent material consisting of the fired reaction product of, by weight, twenty per cent zinc fluoride, one-half per cent manganese activator, with the remainder a member selected from the group consisting of $Cd_3(PO_4)_2$ and $Cd_3(PO_4)_2 \cdot 2CdHPO_4 \cdot 4H_2O$.

9. A luminescent material consisting of the fired reaction product of, by weight, twenty per cent zinc fluoride, four per cent manganese activator, with the remainder a member selected from the group consisting of $Cd_3(PO_4)_2$ and $Cd_3(PO_4)_2 \cdot 2CdHPO_4 \cdot 4H_2O$.

10. The method of preparing a luminescent material which comprises mixing together from five to twenty per cent, by weight, zinc fluoride, one-eighth to four per cent, by weight, manganese activator, with the remainder a member selected from the group consisting of $Cd_3(PO_4)_2$ and $Cd_3(PO_4)_2 \cdot 2CdHPO_4 \cdot 4H_2O$ and firing at a temperature ranging from 900 to 1100° C. for at least one hour.

11. The method of preparing a luminescent material which comprises mixing together from five to twenty per cent, by weight, zinc fluoride, one-eighth to four per cent, by weight, manganese activator, with the remainder a member selected from the group consisting of $Cd_3(PO_4)_2$ and $Cd_3(PO_4)_2 \cdot 2CdHPO_4 \cdot 4H_2O$ and firing at a temperature ranging from 900 to 1000° C. for at least one hour.

12. The method of preparing a luminescent material which comprises mixing together from five to twenty per cent, by weight, zinc fluoride, one-eighth to four per cent, by weight, manganese activator, with the remainder a member selected from the group consisting of $Cd_3(PO_4)_2$ and $Cd_3(PO_4)_2 \cdot 2CdHPO_4 \cdot 4H_2O$ and firing at a temperature of 950° C. for at least one hour.

JEROME S. PRENER.

References Cited in the file of this patent

UNITED STATES PATENTS

| Number | Name | Date |
|---|---|---|
| 2,558,532 | Banca | June 26, 1951 |

FOREIGN PATENTS

| Number | Country | Date |
|---|---|---|
| 469,731 | Great Britain | July 27, 1937 |